US011485426B1

(12) United States Patent
Leslie et al.

(10) Patent No.: US 11,485,426 B1
(45) Date of Patent: Nov. 1, 2022

(54) TRUCK RACK ASSEMBLY

(71) Applicants: William D. Leslie, Bradenton, FL (US); Bradley J Kapper, Bradenton, FL (US)

(72) Inventors: William D. Leslie, Bradenton, FL (US); Bradley J Kapper, Bradenton, FL (US)

(73) Assignee: Equipmount LLC, Bradenton, FL (US)

( * ) Notice: Subject to any disclaimer, the term of this patent is extended or adjusted under 35 U.S.C. 154(b) by 96 days.

(21) Appl. No.: 17/062,099

(22) Filed: Oct. 2, 2020

(51) Int. Cl.
*B60P 3/40* (2006.01)
*B62D 33/02* (2006.01)

(52) U.S. Cl.
CPC ................. *B62D 33/0207* (2013.01)

(58) Field of Classification Search
CPC ....... B62D 33/0207; B60R 9/00; B60R 9/045; B60R 9/04; B60P 3/40
See application file for complete search history.

(56) References Cited

U.S. PATENT DOCUMENTS

| 4,138,046 | A | * | 2/1979 | De Freze | B60R 9/00 224/543 |
|---|---|---|---|---|---|
| 4,637,492 | A | | 1/1987 | Herr | |
| 4,966,091 | A | | 10/1990 | De Suarez D'Aulan | |
| 5,124,902 | A | | 6/1992 | Puglisi | |
| 5,268,824 | A | | 12/1993 | Czipri | |
| 5,803,585 | A | | 9/1998 | Littman et al. | |
| 5,927,847 | A | | 7/1999 | Cales et al. | |
| 6,186,088 | B1 | | 2/2001 | Garnier et al. | |
| 7,021,236 | B1 | | 4/2006 | Czipri | |
| 7,757,916 | B1 | * | 7/2010 | Petrie | B60R 9/00 224/403 |
| 9,708,014 | B1 | * | 7/2017 | Ichtchenko | B62D 33/0207 |
| 2008/0055905 | A1 | | 3/2008 | Chiu | |
| 2014/0034696 | A1 | * | 2/2014 | Marr | B60R 9/045 224/405 |
| 2014/0197653 | A1 | * | 7/2014 | Stepanians | B60P 3/40 296/3 |
| 2015/0258940 | A1 | * | 9/2015 | Breeden, III | B60R 9/045 224/405 |
| 2016/0288887 | A1 | | 10/2016 | Corley | |

* cited by examiner

*Primary Examiner* — Corey N Skurdal
(74) *Attorney, Agent, or Firm* — Edward M. Livingston, Esq.; Livingston Law, P.A.

(57) ABSTRACT

A truck rack assembly (1) having bed rail caps (3) that attach to bed rails (34) of a truck (2), said bed rail caps having receivers (10) into which uprights (4) with bayonet-style pins (15) can be inserted, said uprights having height adjustable sleeves (6) with attached cradles (14) for holding crossbars (5), The receivers and bayonet-style pins form a male-female quick disconnect system by pins (32) in a receiver socket (30) engaging a channel (25) in the bayonet-style pin.

12 Claims, 6 Drawing Sheets

TRUCK RACK ASSEMBLY

CROSS-REFERENCE TO RELATED APPLICATION

This application is a continuation-in-part of application Ser. No. 16/856,769 filed on Apr. 23, 2020, which is currently pending. The patent application identified above are incorporated herein by reference in their entirety to provide continuity of disclosure.

FIELD OF THE INVENTION

This invention relates to truck racks and more particularly to a truck rack that can be easily and quickly installed and removed from a truck as needed.

BACKGROUND OF THE INVENTION

Most conventional pickup truck racks are difficult and cumbersome to install and remove and thus once installed become a nearly permanent fixture on a truck. Also, most conventional truck racks cannot be installed on a truck that also has a bed cover as it interferes with access to the pickup truck bed. Many owners of pickup trucks want to use the racks to safely and securely carry kayaks or other watersport items without having to use the covered bed of the pickup truck. Furthermore, most conventional truck racks are of a utility nature and somewhat too unsightly to install on a nice pickup truck.

Thus, a need exists for a rack that can be easily and quickly installed and removed from a truck and can be installed over a bed cover without interfering with the operation of the bed cover which can be used to safely and securely carry kayaks and other items.

SUMMARY OF THE INVENTION

The primary object of the present invention is to provide a truck rack that can be easily and quickly installed when needed.

Another object of the present invention is to provide a truck rack that can be installed on a pickup truck having a bed cover that does not interfere with the operation of the bed cover.

An ancillary object of the present invention is to provide such a truck rack that has a nice appearance, unlike conventional utility truck racks.

The present invention fulfills the above and other objects by providing a truck rack assembly having at least two bed rail caps, each bed rail cap being elongated and sized to fit over a truck bed rail and attachable thereto, said bed rail caps having a plurality of receivers predeterminedly positioned along a length of said bed rail caps with at least four uprights, each having a top cap and a bottom, mounted in a receiver and at least one crossbar for each of every two uprights, each crossbar being mounted between two uprights. Each receiver in each bed rail cap is a quick connect and disconnect pin and socket. Each crossbar is mounted to each of two uprights by a cross bar support attached to each upright at a predetermined desired level by a pin, said crossbar support having a cradle on which an end each crossbar rests and pins for securing said crossbar in the cradle. Each receiver has a socket with two opposing pins on an inner circumference for receiving a bayonet-style pin on the bottom of each upright, said bayonet-style pin having an inverted J-shaped channel on an outer circumference thereof to engage with the pins in the socket of the receiver. An accessory tie down having a shackle mounted to a top of a like pin as on the bottom of the uprights for insertion into the receivers is provided for tying down items being carried on the truck rack assembly.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
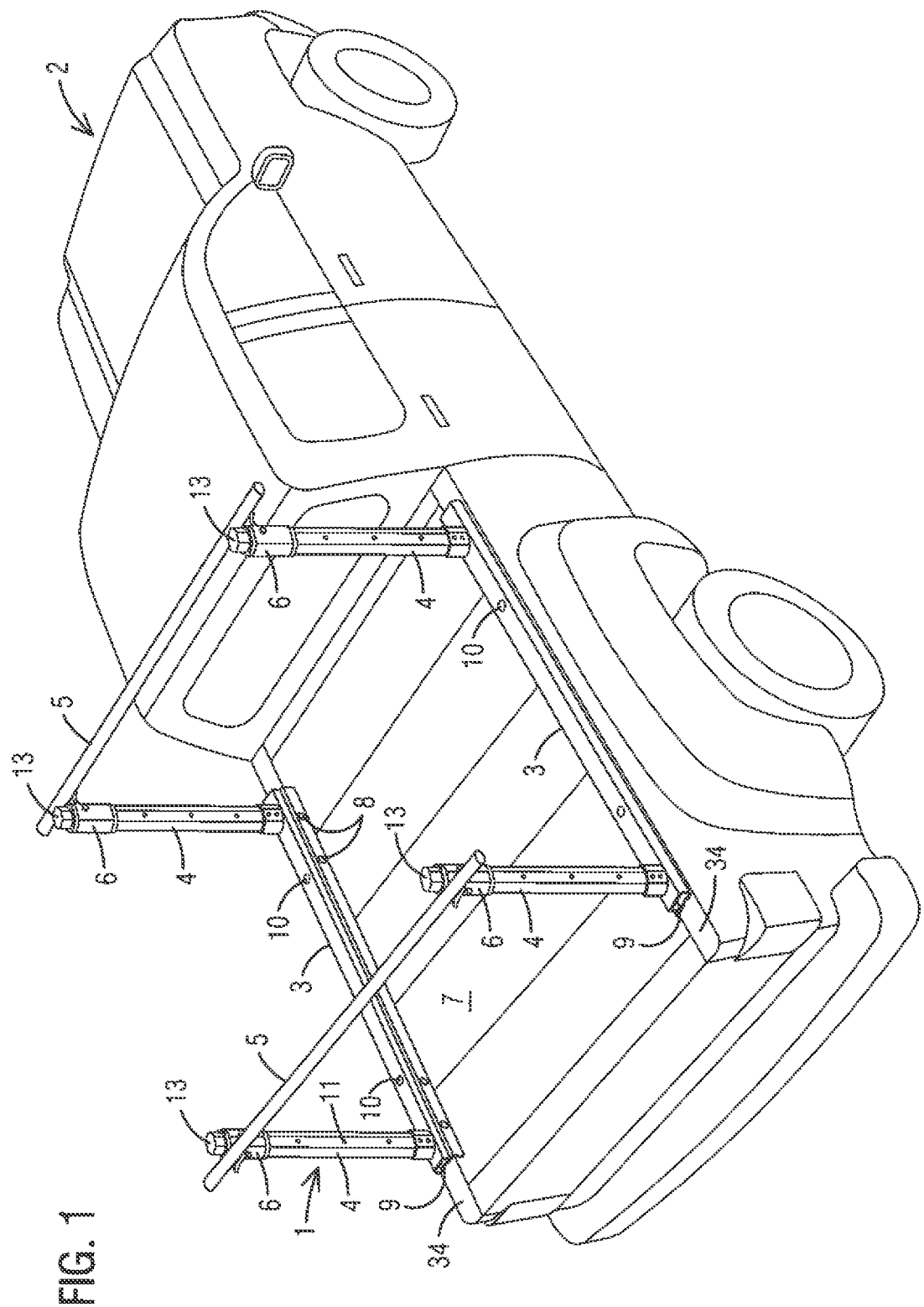
FIG. 1 is a top perspective view of a truck rack assembly of the present invention installed on a pickup truck.
Figure 2:
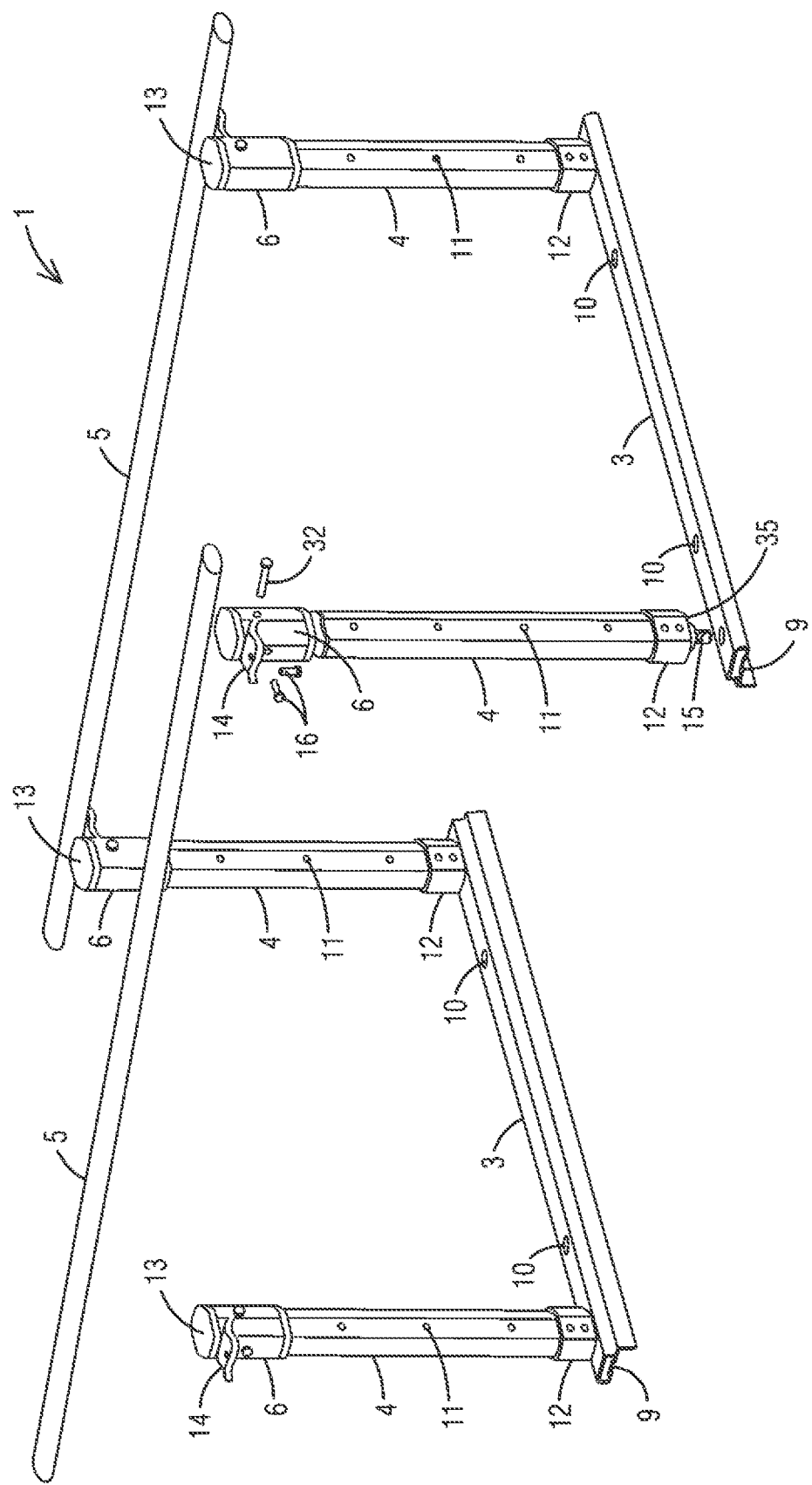
FIG. 2 is a partially exploded perspective view of the truck rack assembly of the present invention.

For purposes of describing the preferred embodiment, the terminology used in reference to the numbered accessories in the drawings is as follows:
 1. truck rack assembly, generally
 2. pickup truck
 3. bed rail caps
 4. uprights
 5. crossbars
 6. sleeves
 7. truck bed cover
 8. bed rail cap attachment clamps
 9. socket
 10. quick disconnect receivers
 11. upright height adjustment apertures
 12. upright base holders
 13. upright end caps
 14. crossbar cradle
 15. bayonet pin
 16. cradle pins
 17. inner side of bed rail cap
 18. inner top of bedrail cap
 19. base of bed rail cap
 20. top of bed rail cap
 21. tie downs, generally 22. shackle
23. shackle pin
24. base of tie down
25. channel
26. compression ring
27. outer surface of receiver
28. bottom edge of receiver
29. top edge of receiver
30. receiver socket
31. flange
32. pin
33. inner circumference of receiver socket
34. truck bedrails
35. bottom end of uprights
36. sleeve pin
37. opening in pin channel
38. rail brackets
39. rail clamps
40. rail bracket adjustment slots With reference to FIGS. 1 and 2, a truck rack assembly 1 of the present invention is illustrated. The truck rack assembly 1 comprises bed rail caps 3 that attach by clamps to bed rails 34 of a pickup truck 2. Each bed rail cap 3 comprises an elongated member with a socket 9 on an underside to fit over the truck bed rails 34 having a plurality of receivers 10 spaced apart along the length thereof. The receivers 10 provide attachment points for uprights 4. The uprights 4 comprise elongated members having base holders 12 with male bayonet-style pins 15 extending from bottom ends 35 thereof. The pins 15 engage sockets 30 in the receivers 10 on the bed rail caps 3 to lock the uprights 4 in vertical positions in relation to the bed rail caps 3. Crossbars 5 attach to the uprights 4 via sleeves 6 attached by pins 35 to a top of the uprights 4 with cradles 14 attached thereto by pins 16 that allow the height of the crossbars 3 to be adjusted at a desired height above the truck 11 bed cover 7. Each upright 4 has an end cap 13 to stop water intrusion and may be contain a logo on top. In addition, the uprights 4 may be adjustable in height by adjusting leaf spring pins in the apertures 11.

Figure 3:
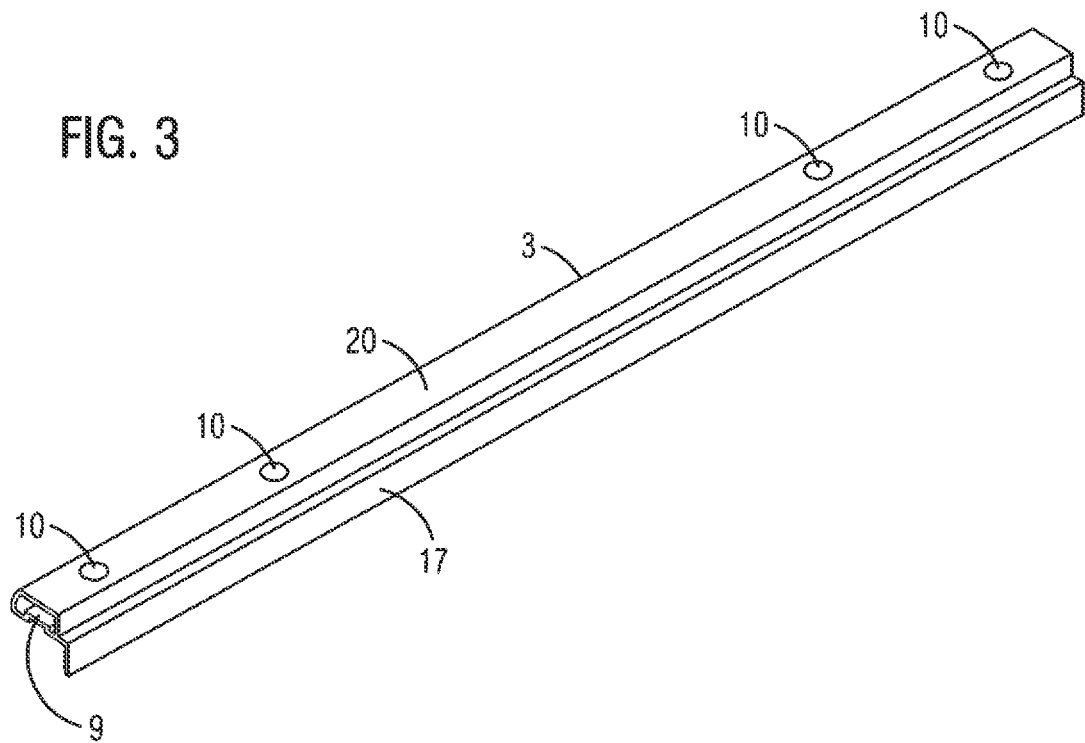
FIG. 3 is a top perspective view of a rail of the truck rack assembly of the present invention.
Figure 4:
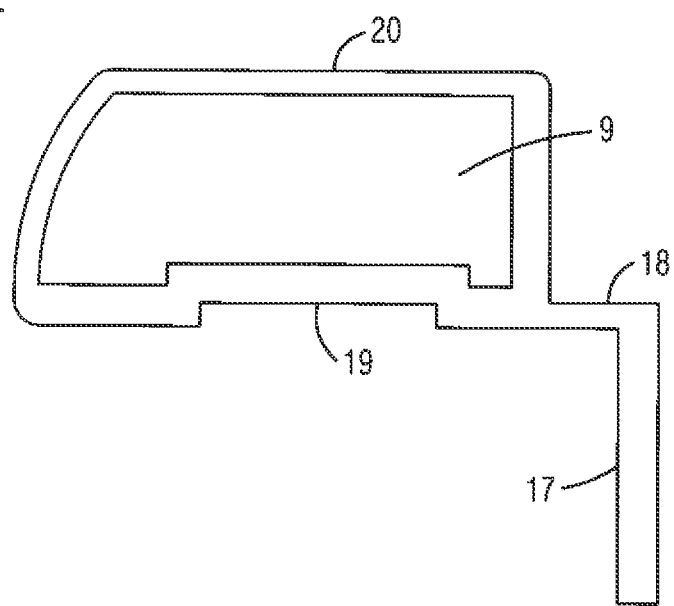
FIG. 4 is an end view of a rail of the truck rack assembly of the present invention.

Referring to FIGS. 3 and 4 a perspective view and end view of the bed rail cap 3, respectively, are illustrated. The bed rail cap 3 has a top side 20 that has a plurality of receivers 10 and an inner top 18 and inner side 17 that abut an inside of a truck bed rail 34 when installed. The bed rail cap has a socket 9 and bottom 19 that fits over the truck bed rails 34.

Figure 5:
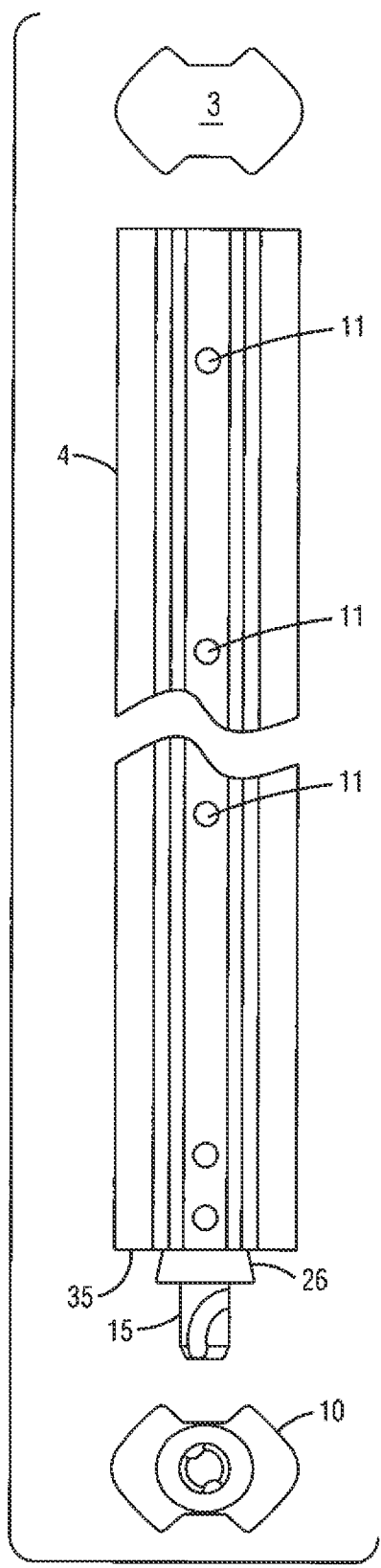
FIG. 5 is a side view of a vertical upright of the truck rack assembly of the present invention.

Referring to FIG. 5 a side view of a vertical upright 4 of the present invention is illustrated. The uprights 4 comprise elongated members having bayonet-style pins 15 extending from the bottom ends 35 thereof. The pins 15 engage the receivers 10 of the bed rail caps 3 to lock the uprights 4 in vertical positions in relation to the bed rail caps 3, Compression rings 26 at the bottom end 35 of each upright 4 help eliminate vibration and noise. Height adjustment apertures 11 at spaced intervals along a length of the uprights 4 allow for adjustment of the height of the uprights 4 above a truck bed. An end cap 3 on top of each upright 4 prevents water intrusion and may contain a logo.

Figure 6:
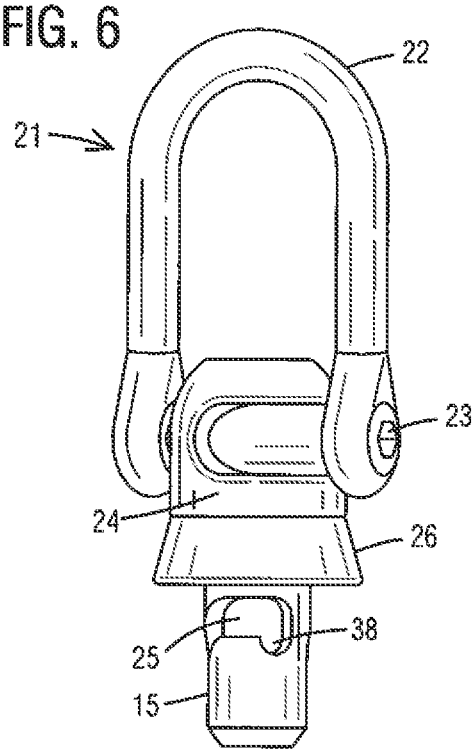
FIG. 6 is a side view of a tie down attachment of the truck rack assembly of the present invention.
Figure 7:
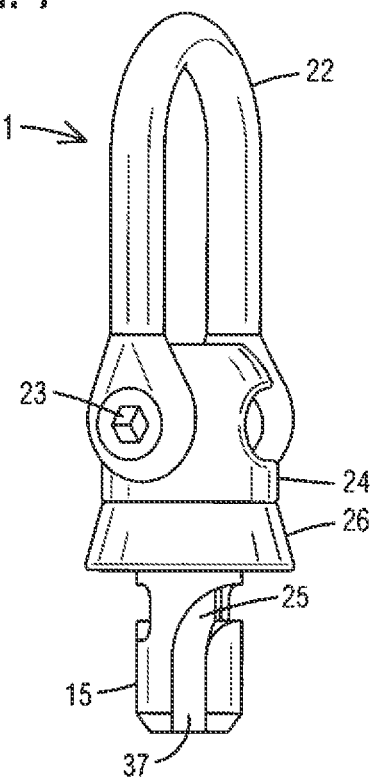
FIG. 7 is a side perspective view of the tie down attachment of the truck rack assembly of the present invention.
Figure 8:
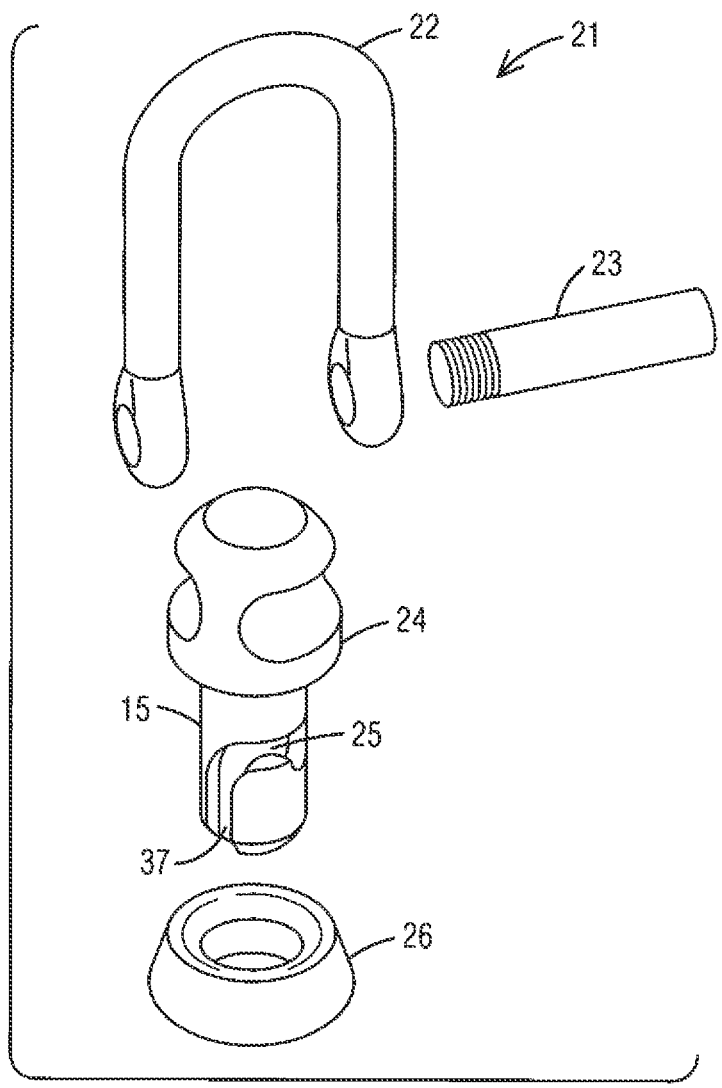
FIG. 8 is an exploded top perspective view of a tie down attachment of the truck rack assembly of the present invention.

With reference to FIGS. 6, 7 and 8, a side, perspective and exploded perspective views, respectively of the tie downs 21 of the present invention are illustrated. Each tie down 22 has a shackle 22 extending upward and attached to base 24 of each tie down 21 by a pin 23. The pin 15 comprises an elongated cylindrically-shaped body having substantially J-shaped channels 25 located on its outer surface. The J-shaped channels 25 have an opening 37 located on the bottom edge the pin 15, The channels 25 then extend upward toward the top end of the pin 15 and curve or turn back toward the bottom of the pin 5 to form an inverted J-shape. As such the tie downs 21, which share the same type pin 15 as the uprights 4 can be inserted into the socket 30 of the receivers 10 shown in FIG. and then given a twist to lock them in place. Just like the uprights 4 each tie down 21 has a compression ring 26 around the pin 15 at the point where it the tie down 21 abuts the receiver 10 to provide upward pressure to hold the tie downs in place. The stud 13 further comprises a compression ring 37 located on the top end 18 of the cylindrical body of the stud 13.

Figure 9:
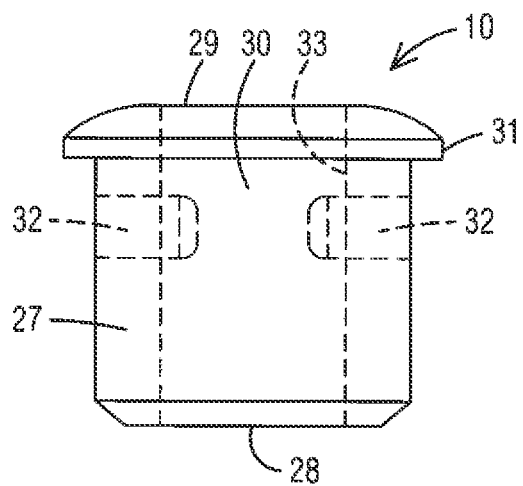
FIG. 9 is a perspective plan view of a quick disconnect receiver of the truck rack assembly of the present invention.

FIG. 9 is a perspective plan view of the receiver 10 of the truck rack assembly of the present invention. Each receiver 10 has a preferably round outer surface 27 that fits into holes in each bed rail cap 3 and has a bottom 28 that bottoms out on an inside bottom of each bed rail cap socket 9. The top edge 29 of the receiver 10 is surrounded by a flange 31 that rests on a top edge of the bed rail cap 3. Receiver sockets 30 in each receiver 10 are sized to receive the pins 15 on a bottom of the uprights 4 and tie downs 21. Small pins 32 extend from opposite sides of an inner circumference of the receiver socket engage the substantially J-shaped channels 25 of the locking pins 15 so that when the uprights 4 or tie downs 21 are inserted and pressed downward and rotated until a pin 32 reaches the serif 38 at the top end of the channel 15, the uprights 4 and tie downs 21 will be locked in place on the bed rail caps 3. The compression rings 26 then push the pins 15 away from the socket 2 to keep the pins 32 locked in the channel serifs 38.

Figure 10:
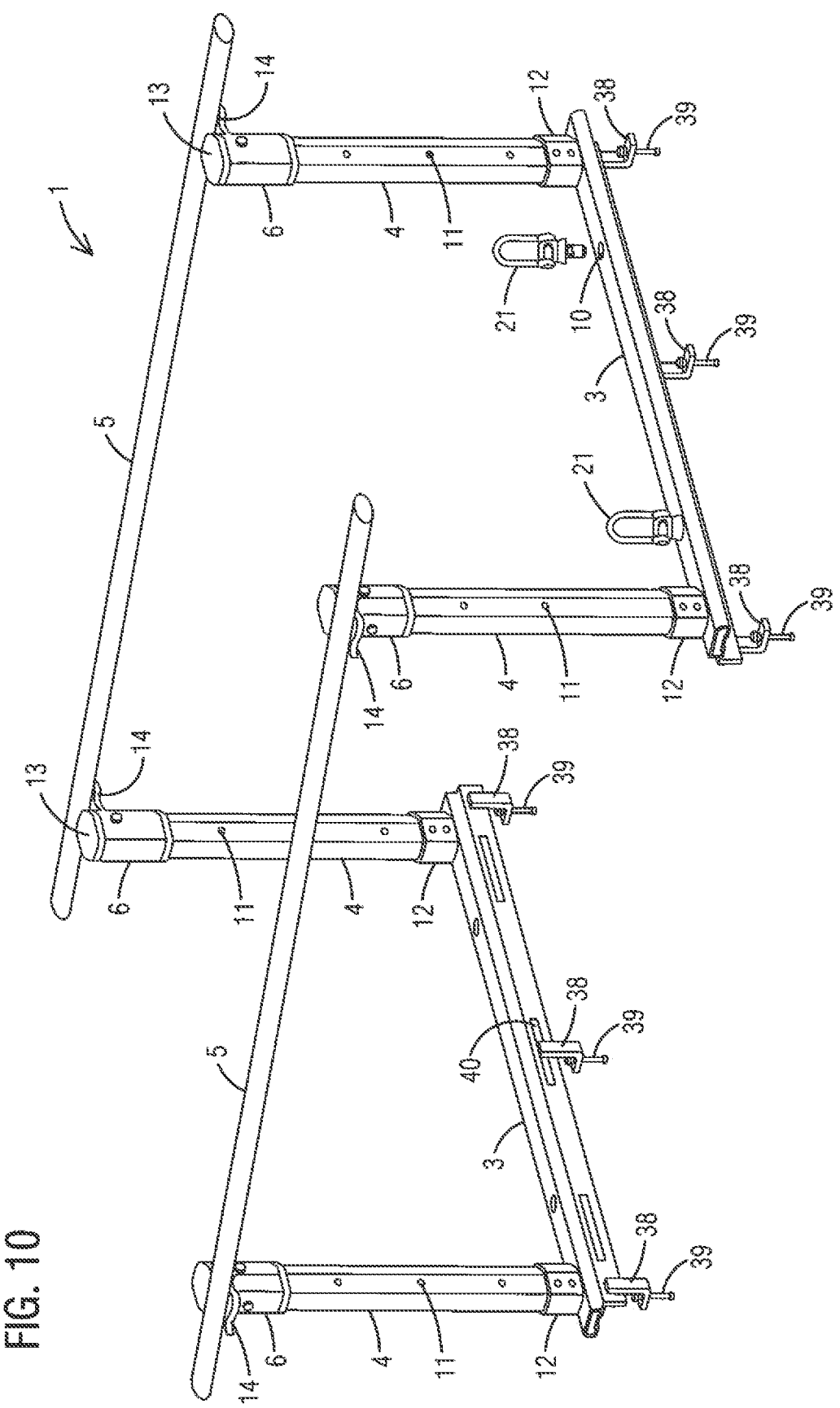
FIG. 10 is a perspective view of the truck rack assembly of the present invention with truck rail attachment brackets and tie down inserts.

FIG. 10 illustrates a perspective view of the truck rack assembly 1 depicting the same components as discussed previously with the addition of rail brackets 38 with clamps for securing the rails 3 to the inside bed of a truck. Slots 40 are provided on an inside of the rails 3 so the brackets 38 can be positioned in a range of location depending on the size of a truck bed. Also, tie downs 21 are shown which can be inserted into the quick disconnect receivers 10 on a top surface of the rails 3 to tie rope or line over items for securing such items being carried above the crossbars 5.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described our invention, we claim:

1. A truck rack assembly comprising:
   at least two bed rail caps, each bed rail cap being elongated and sized to fit over a truck bed rail and attachable thereto, said bed rail caps having a plurality of receivers predeterminedly positioned along a length of said bed rail caps;
   at least four uprights, each having a top cap and a bottom, each upright mounted in one of said receivers;
   at least one crossbar for each of every two uprights, each crossbar being mounted between and to two uprights; and
   wherein each receiver has a socket with two opposing pins on an inner circumference for receiving a bayonet-style pin on the bottom of each upright, said bayonet-style pin having an inverted channel on an outer circumference thereof to engage with the pins in the socket of the receiver.

2. The truck rack assembly of claim 1 wherein:
each bed rail cap is attachable to a truck bed rail by at least one clamp.

3. The truck rack assembly of claim 1 wherein:
each receiver in each bed rail cap is a quick connect and disconnect pin and socket.

4. The truck rack assembly of claim 1 wherein:
each crossbar is mounted to each of two uprights by a cross bar support attached to each upright at a predetermined desired level by a pin, said crossbar support having a cradle on which an end of each crossbar rests and pins for securing said crossbar in the cradle.

5. The truck rack assembly of claim 1 further comprising:
one or more tie downs having a shackle mounted by a pin to a top of a quick of a bayonet-style pin for insertion into a receiver.

6. The truck rack assembly of claim 1 wherein:
each cradle is attached to a sleeve around each upright and each upright has holes at predetermined points so that the cradle may be adjustable in height above a truck bed by moving the cradle up or down to a desired height and inserting a pin on the sleeve into a hole in the upright.

7. A truck rack assembly comprising:
at least two bed rail caps, each bed rail cap being elongated and sized to fit over a truck bed rail and attachable thereto, said bed rail caps having a plurality of receivers predeterminedly positioned along a length of said bed rail caps;
at least four uprights, each having a top cap and a bottom, each upright mounted in one of said receivers;
at least one crossbar for each of every two uprights, each crossbar being mounted between and to two uprights; and
wherein each crossbar is mounted to each of two uprights by a cross bar support attached to each upright at a predetermined desired level by a pin, said crossbar support having a cradle on which an end of each crossbar rests and pins for securing said crossbar in the cradle.

8. The truck rack assembly of claim 7 wherein:
each bed rail cap is attachable to a truck bed rail by at least one clamp.

9. The truck rack assembly of claim 7 wherein:
each receiver in each bed rail cap is a quick connect and disconnect pin and socket.

10. The truck rack assembly of claim 7 wherein:
each receiver has a socket with two opposing pins on an inner circumference for receiving a bayonet-style pin on the bottom of each upright, said bayonet-style pin having an inverted channel on an outer circumference thereof to engage with the pins in the socket of the receiver.

11. The truck rack assembly of claim 10 further comprising:
one or more tie downs having a shackle mounted by a pin to a top of a quick of a bayonet-style pin for insertion into a receiver.

12. The truck rack assembly of claim 7 wherein:
each cradle is attached to a sleeve around each upright and each upright has holes at predetermined points so that the cradle may be adjustable in height above a truck bed by moving the cradle up or down to a desired height and inserting a pin on the sleeve into a hole in the upright.

* * * * *